United States Patent
Hertel

(10) Patent No.: US 10,294,715 B1
(45) Date of Patent: May 21, 2019

(54) METHODS OF FORMING A TEMPORARY SEAL FOR FLOOD PROTECTION

(71) Applicant: Diana L. Hertel, Houston, TX (US)

(72) Inventor: Diana L. Hertel, Houston, TX (US)

(*) Notice: Subject to any disclaimer, the term of this patent is extended or adjusted under 35 U.S.C. 154(b) by 0 days.

(21) Appl. No.: 15/860,179

(22) Filed: Jan. 2, 2018

(51) Int. Cl.
| B28B 3/00 | (2006.01) |
| E06B 7/16 | (2006.01) |
| B28B 13/06 | (2006.01) |
| B29C 43/18 | (2006.01) |
| B29C 65/76 | (2006.01) |
| B29C 65/70 | (2006.01) |

(52) U.S. Cl.
CPC ............ *E06B 7/16* (2013.01); *B29C 65/70* (2013.01); *B29C 65/76* (2013.01); *B28B 3/00* (2013.01); *B28B 13/06* (2013.01); *B29C 2043/189* (2013.01)

(58) Field of Classification Search
None
See application file for complete search history.

(56) References Cited

U.S. PATENT DOCUMENTS

| 2,145,284 | A | * | 1/1939 | Anderson | E04B 1/66 206/819 |
| 2,835,612 | A | | 2/1943 | Coutlee | |
| 2,454,821 | A | * | 11/1948 | McKee | E06B 3/56 206/225 |
| 3,401,486 | A | * | 9/1968 | Adell | B60R 13/043 29/458 |
| 4,449,267 | A | | 5/1984 | Siemion | |
| 4,488,386 | A | | 12/1984 | Thompson | |
| 4,611,429 | A | | 9/1986 | Kanies | |
| 4,629,648 | A | * | 12/1986 | Minick | B29C 47/003 156/244.11 |
| 4,650,368 | A | | 3/1987 | Bayer | |
| 4,660,323 | A | | 4/1987 | Kanies | |
| 5,730,446 | A | * | 3/1998 | Taylor | B60R 13/043 277/312 |
| 6,425,213 | B1 | | 7/2002 | Lachapelle | |
| 6,460,299 | B1 | | 10/2002 | Burrow | |
| D574,088 | S | | 7/2008 | Kercher, III | |
| 7,762,742 | B1 | | 7/2010 | Smith | |

(Continued)

FOREIGN PATENT DOCUMENTS

| DE | 102006018557 | * | 10/2007 |
| DE | 202011000107 | * | 6/2012 |

(Continued)

OTHER PUBLICATIONS

3M Fire Water Barrier Tape Brochure (Year: 2017).*

(Continued)

*Primary Examiner* — Edmund H Lee
(74) *Attorney, Agent, or Firm* — Amerson Law Firm, PLLC

(57) ABSTRACT

One illustrative method disclosed herein includes positioning a plurality of individual sections of a moldable material adjacent one another and adjacent a structure to be sealed, and forcing the individual sections against one another and at least the structure so as to deform the plurality of individual sections and thereby form a substantially contiguous temporary seal comprised of the moldable material between the structure and at least a portion of the opening in which the structure is positioned.

18 Claims, 12 Drawing Sheets

(56) References Cited

U.S. PATENT DOCUMENTS

| | | |
|---|---|---|
| 8,287,209 B2 | 10/2012 | Feldman et al. |
| 8,287,982 B2 | 10/2012 | Brewin et al. |
| 2003/0110717 A1 | 6/2003 | Rodriguez |
| 2011/0283627 A1 | 11/2011 | Shaw |
| 2013/0108372 A1 | 5/2013 | Abeles |
| 2017/0174963 A1* | 6/2017 | Riepl .................. C09K 3/1018 |

FOREIGN PATENT DOCUMENTS

| | | | |
|---|---|---|---|
| JP | 03157170 | * | 7/1991 |
| JP | 20001108110 | * | 4/2001 |
| WO | WO2012098115 | * | 7/2012 |

OTHER PUBLICATIONS

3M Fire and Water Barrier Tape: Installation Guide (Year: 2017).*
3M Moldable Putty Installation Guide (Year: 2015).*
The article titled "Taking the Mystery Out of How to Make a Concrete Sink Mold" (found at www.reynoldsam.com/smogal/?id=196; publication date of Sep. 2008; hereinafter referred to as NPL); 5 pages.*
Screenshot showing the publication date of the article titled "Taking the Mystery Out of How to Make a Concrete Sink Mold" (found at www.reynoldsam.com/smogal/?id=196; publication date of Sep. 2008; hereinafter referred to as NPL); 1 page.*

* cited by examiner

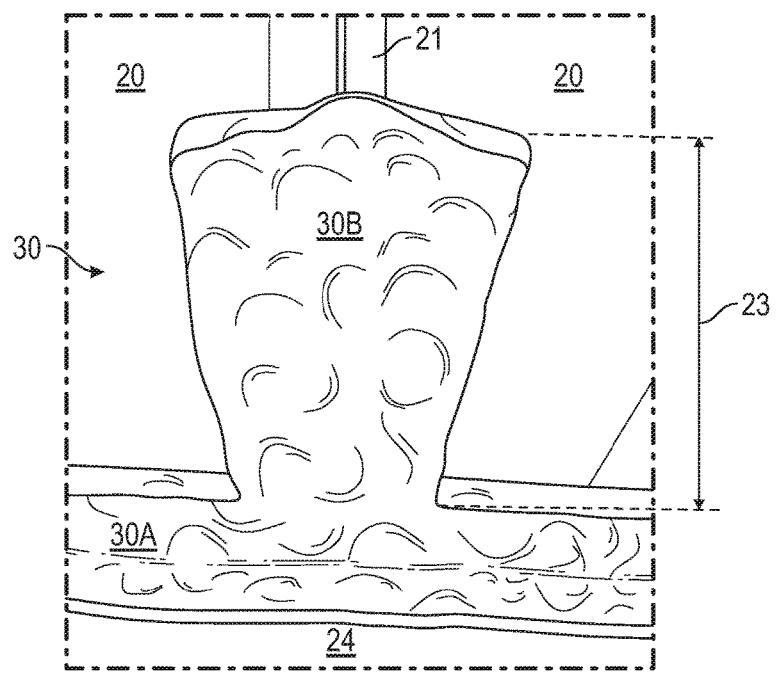
FIG. 8
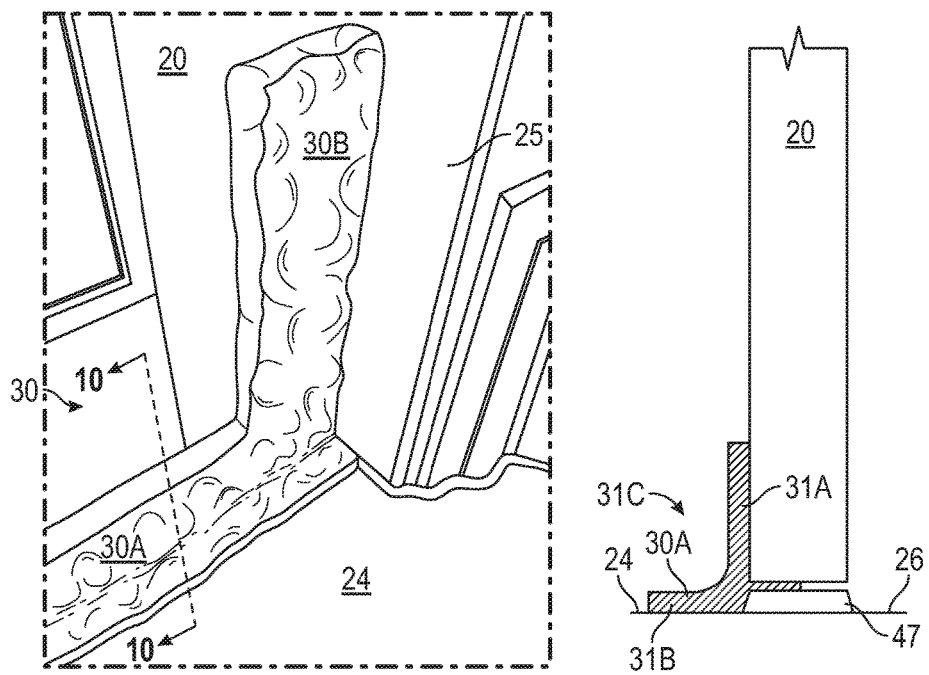
FIG. 9
FIG. 10

METHODS OF FORMING A TEMPORARY SEAL FOR FLOOD PROTECTION

BACKGROUND OF THE INVENTION

1. Field of the Invention

The present disclosure generally relates to the field of temporary flood protection devices and, more specifically, to methods, devices and kits for forming a temporary seal to prevent water from entering a home or a building.

2. Description of the Related Art

Municipalities and federal and state governments go to great lengths and spend enormous sums of money in an effort to protect residences and commercial properties from flooding. For example, infrastructures such as dams, underground water drainage systems and drainage canals are formed in an effort to control the flow of rain water and rivers, and to try to keep water in lakes or reservoirs from overflowing. However, in some cases, despite the best efforts of all involved, systems may fail or weather conditions may be so bad as to simply overwhelm the infrastructure in place for water control. As a result, flooding of residences and/or businesses may occur. Flooding can cause a great deal of monetary damage and emotional anguish to those that are adversely impacted. Even a few inches of flood water in a residence can cause extensive damage, disrupt family's lives for months and take months to repair. Similar problems can arise in the context of business operations as well and can result in loss of significant revenues.

Thus, in some situations, residents and business owners have undertaken measures to try to form some sort of temporary means of preventing flood damage to their properties when there is danger that flooding may occur. One common technique involves placing sandbags around the area to be protected. While this technique can be effective in certain situations, it is very labor-intensive, very time-consuming and typically must be done several days in advance of the anticipated flooding event, at or near the time of an actual flooding event it may be difficult to obtain the necessary manpower and supplies to produce the required number of sandbags.

What is needed is a relatively inexpensive, effective and non-labor-intensive means of providing a temporary seal that may be used by homeowners and business owners to prevent or at least reduce the chances of water entering a residence or place of business during a flooding event.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Generally, the present disclosure is directed to various novel embodiments of methods, devices and kits for forming a temporary seal to prevent water from entering a structure, such as a home or a building. One illustrative method disclosed herein includes positioning a plurality of individual sections of a moldable material adjacent one another and adjacent a structure to be sealed, and forcing the individual sections against one another and at least the structure so as to deform the plurality of individual sections and thereby form a substantially contiguous temporary seal comprised of the moldable material between the structure and at least a portion of the opening in which the structure is positioned.

One illustrative device disclosed herein includes a substantially contiguous seal comprised of a plurality of individual sections of moldable material that are adapted to be positioned against a surface of a structure and a surface of an opening in which the structure is adapted to be positioned, at least some of the moldable material adapted to be positioned between at least a portion of the structure and at least a portion of the opening.

One illustrative kit disclosed herein includes a package and a plurality of individual sections of moldable material positioned within the package, each of the plurality of individual sections of moldable material being separated from one another by at least one layer of material. In this example, the kit also includes instructions for forming a substantially contiguous seal between a structure and an opening in which the structure is positioned by deforming the plurality of individual sections of the moldable material, wherein the instructions are included in or part of the package.

BRIEF DESCRIPTION OF THE DRAWINGS

The disclosure may be understood by reference to the following description taken in conjunction with the accompanying drawings, in which like reference numerals identify like elements, and in which:

FIGS. 1-20 are various views that depict various novel embodiments of methods, devices and kits for forming a temporary seal to prevent water from entering a structure, such as a home or a building.

Figure 1:
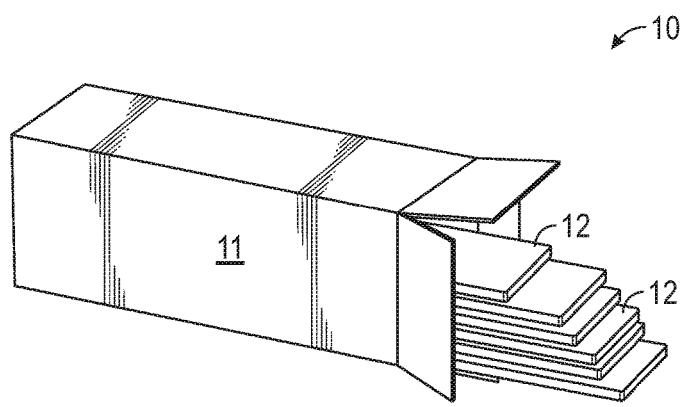

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art after having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIGS. 1-20 are various views that depict various novel embodiments of methods, devices and kits for forming a temporary seal from a moldable material to prevent water from entering a structure, such as a home or a building. In one illustrative embodiment, the methods disclosed herein involve forming a substantially contiguous temporary seal from a moldable material. The presently disclosed inventions will be discussed in the context where such a substantially contiguous temporary seal is formed adjacent a door of a home.

However, as will be appreciated by those skilled in the art after a complete reading of the present application, the substantially contiguous temporary seal disclosed herein may be employed in applications other than those specifically depicted. Thus, the presently disclosed inventions should not be considered to be limited to the illustrative applications disclosed herein.

Figure 2:
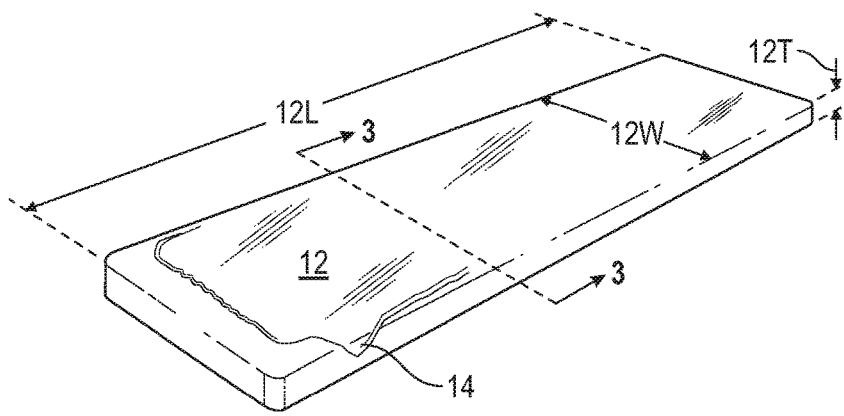
Figure 3:
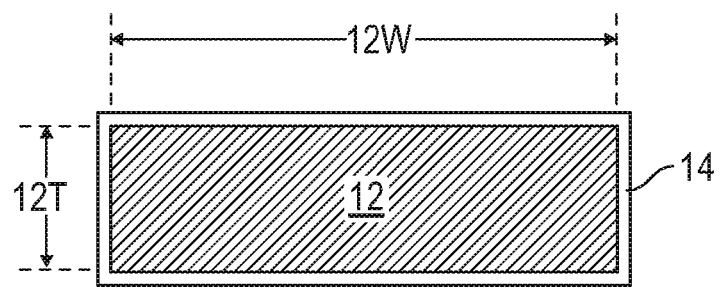
Figure 4:
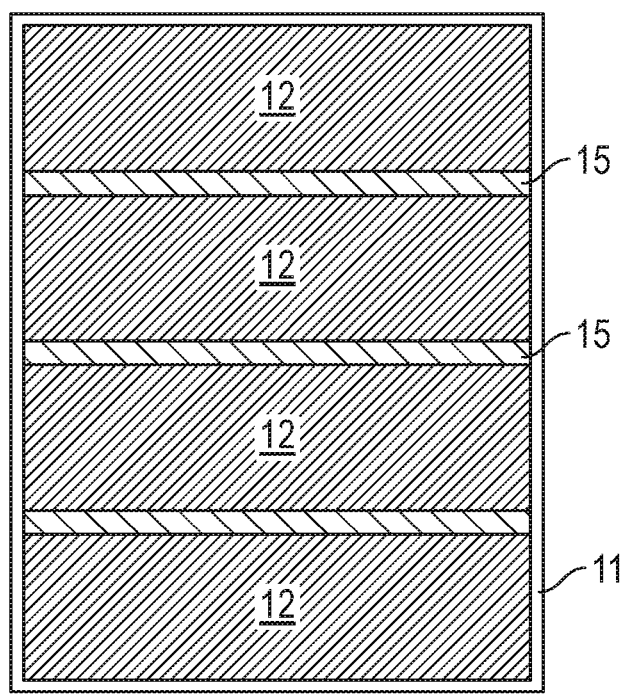

FIG. 1 is a perspective view of an illustrative kit 10 that includes a package 11 that contains a plurality of individual sections 12 of a hand-moldable material. FIG. 2 is an enlarged perspective view of one illustrative embodiment of one of the individual sections 12 of moldable material. FIG. 3 is a cross-sectional view of the illustrative individual section 12 of moldable material shown in FIG. 2. In one illustrative embodiment, the package 11 may take the form of a box, such as a cardboard box. In other cases, the package 11 may take the form of a shrink-wrapped material (not shown) that encapsulates all of the plurality of individual sections 12. As indicated in FIG. 2, in one illustrative embodiment, each of the individual sections 12 of moldable material are individually wrapped in a plastic (or similar material) wrapping 14 to keep the individual sections 12 of moldable material separate from one another. FIG. 4 depicts a cross-sectional view of another embodiment wherein each of the plurality of individual sections 12 is separated from one another by a plastic sheet 15.

The overall size and configuration of the individual sections 12 of moldable material may vary depending upon the particular application and as a matter of design choice. In one illustrative example, the individual sections 12 of moldable material take the form of a substantially rectangular shaped block of material having a length 12L, a width 12W and a thickness 12T, the dimensions of which may vary depending upon the particular application. In one illustrative example, the length 12L may be about 10 inches, the width 12W may be about 3 inches, and the thickness 12T may be about 0.5 inches. In one illustrative embodiment, the individual sections 12 of moldable material may be made of a hand-moldable material such as, for example, modeling compound, which in some cases may be known as plastilina/plastalina clay. In one particular embodiment, the moldable material may comprise an oil-based or wax-based material so as to enhance the ability of the moldable material to form a seal against water intrusion into a building or home. This type of material typically remains pliable and it is typically designed not to harden.

The size and number of individual sections 12 of moldable material provided in the kit 10 may vary depending upon the particular application. In one illustrative example, the kit 10 may contain a sufficient number of individual sections 12 of moldable material so as to permit formation of a substantially contiguous temporary seal 30 disclosed herein on a standard single door, having a width of about 36 inches. In such an application, if a consumer needs to form a temporary seal on a set of double doors, the consumer would simply purchase two of the kits 10. In other cases, the kit 10 may contain a sufficient number of individual sections 12 of moldable material so as to permit the formation of the substantially contiguous temporary seal 30 disclosed herein on a set of French doors (of a specified width) or on a garage door (of a specified width). The kit 10 also comprises instructions (not shown) in the form or text and/or drawings on how to form the substantially contiguous temporary seal 30 disclosed herein. In one example, the instructions may be printed on the outside of the package 11 or the instructions may be written on one or more sheets of paper that are included within the package 11. Such instructions may also include text and/or pictures that instruct a consumer as to how to form the individual sections 12 of moldable material to plug or block other potential paths of water ingress into a home or building, such as weep holes, as described more fully below.

One illustrative method for forming the novel substantially contiguous temporary seal 30 disclosed herein will now be discussed. In general, in one illustrative embodiment, the methods disclosed herein involve forming a substantially contiguous, substantially water-tight seal 30 comprised of the moldable material between a structure that is to be sealed (such as a door, a window or a garage door) and at least a portion of the opening (e.g., a door frame, a floor, a window sill, etc.) in which the structure is positioned. In one particular example, this is accomplished by forcing a plurality of the individual sections 12 of moldable material against one another and at least the structure that is to be sealed so as to deform the plurality of individual sections 12 of moldable material and thereby form the substantially contiguous seal 30 comprised of the moldable material between the structure to be sealed and at least a portion of the opening (in which the structure is positioned). The moldable material has a composition and consistency so as to permit an individual to mold, deform and force the moldable material by hand so as to form the desired seal 30. As used herein and in the claims, the term "moldable material" shall be understood to be a material that is capable of being deformed by application of a force supplied by an adult human being of average strength. Typically, a user may physically deform the sections 12 of moldable material to achieve the seal 30 by applying force with the user's fingers and thumbs, i.e., deforming the moldable material via direct contact with human hands. In other cases, a human may use a relatively blunt object or "tool," such as the handle of an ordinary hammer, the end of a broom, a wooden spoon, etc., during some or all of the process of deforming the sections 12 of moldable material to achieve the desired seal 30.

Figure 5:
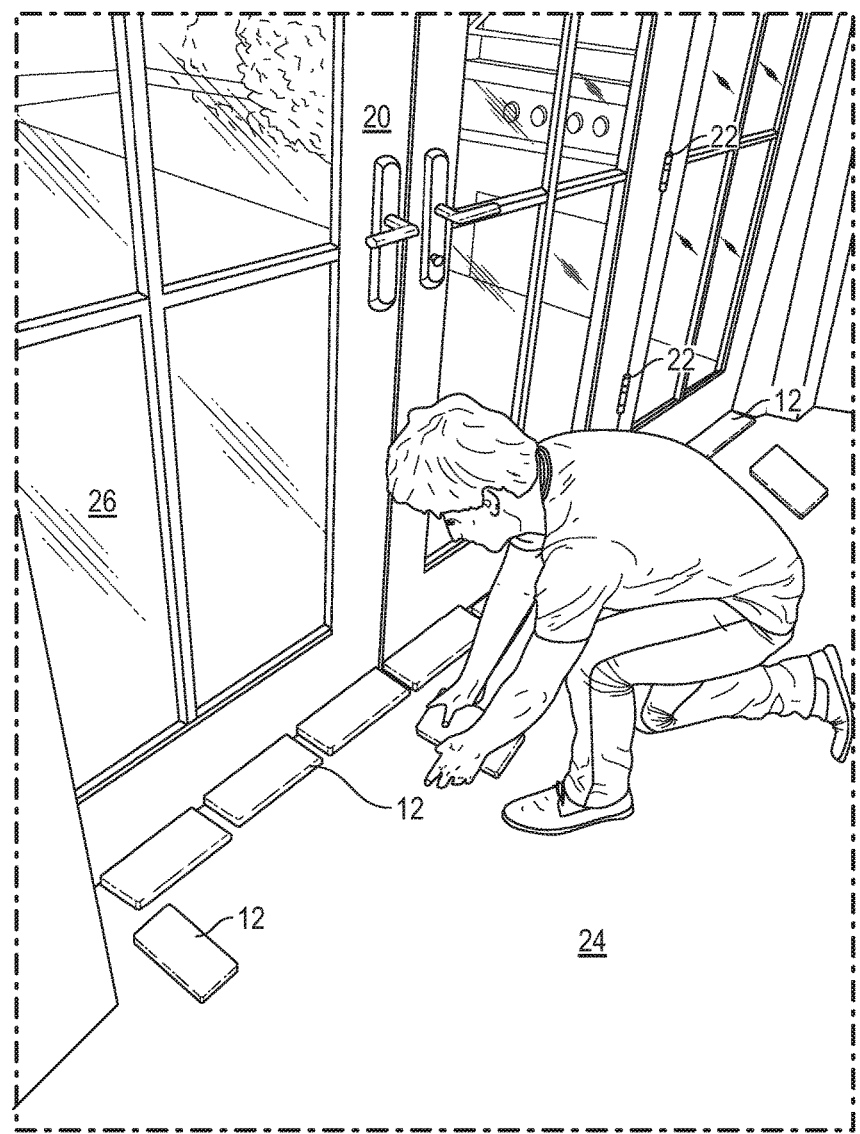

FIG. 5 depicts an embodiment wherein the novel seal 30 disclosed herein will be formed adjacent a structure or door 20, in this case a set of double doors. At the point shown in FIG. 5, the individual sections 12 of moldable material have been removed from the package 11 and placed in approximate locations adjacent the door 20 on the interior side of the door 20. In the example disclosed herein, the seal 30 will be formed on the interior surface of the door 20. However, as will be appreciated by those skilled in the art after a complete reading of the present application, the novel seal 30 disclosed herein may also be formed on the exterior surface of the door 20 or on both the interior and exterior surfaces of the door 20. With reference to FIG. 5, the door 20 is mounted to a door frame or jamb with a plurality of hinges 22. The interior floor 24 and exterior floor 26 of the building are also depicted in FIG. 5. The novel seal 30 disclosed herein may be employed irrespective of the type of flooring used for the interior and exterior floors 24, 26, e.g., bricks, blocks, wood, tile, etc., and irrespective of the surface finish of the interior and exterior floors 24, 26. That is, one feature of the novel seal 30 disclosed herein is that, due to the moldable nature of the molding material of the sections 12, the material may be deformed to accommodate virtually any type of surface (be it smooth, or rough or irregular) on either the floor, the door jamb, or the door itself so as to form the desired seal 30.

Figure 6:
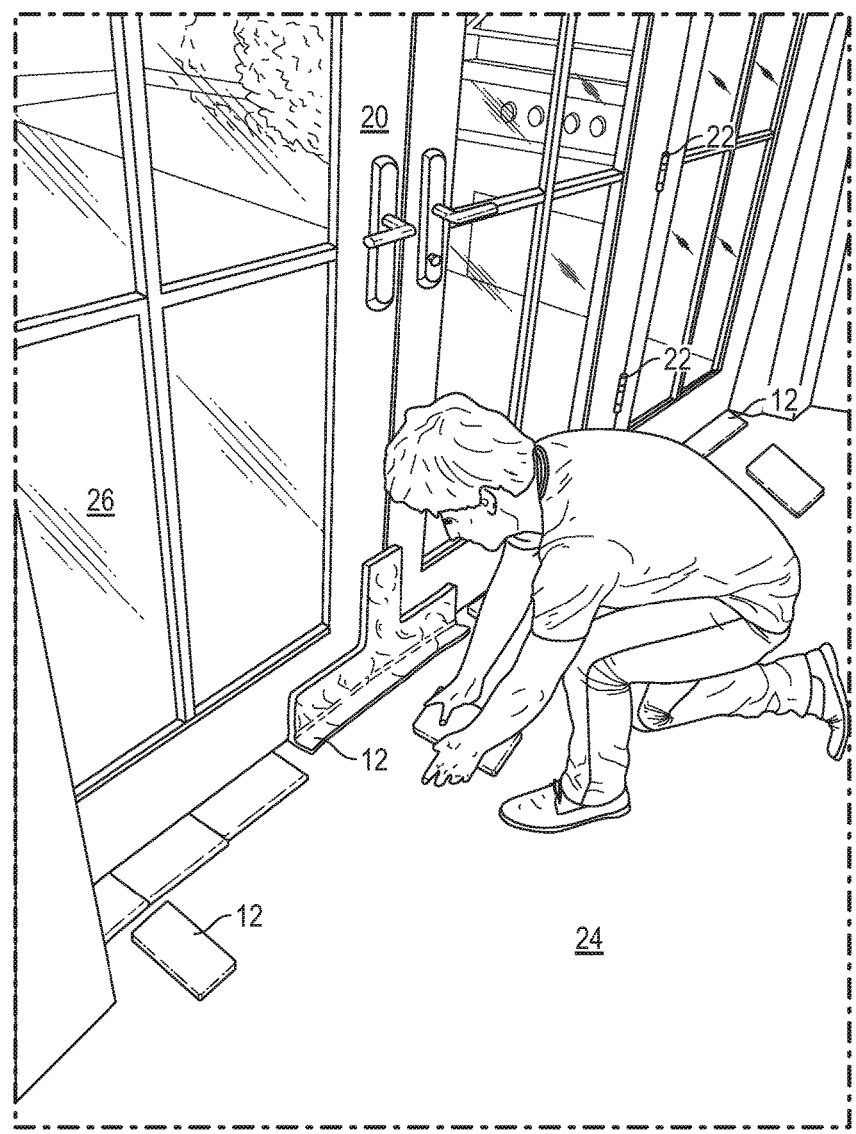

At the point of operations shown in FIG. 6, the individual sections 12 of moldable material have been positioned laterally adjacent one another in preparation of beginning the actual process of forming the seal 30 and some of the individual sections have been deformed by the individual as part of the process of forming the seal 30. Prior to this point, if needed, one or more sections of the individual sections 12 of moldable material may be cut to a shorter desired length to, for example, fill in a gap between the end of a section and the door jamb, wherein the gap is less than the full length of a single section 12. The moldable material used herein may be readily cut with a common case knife, a putty knife, or it may even be torn into smaller sections by hand.

Figure 7:
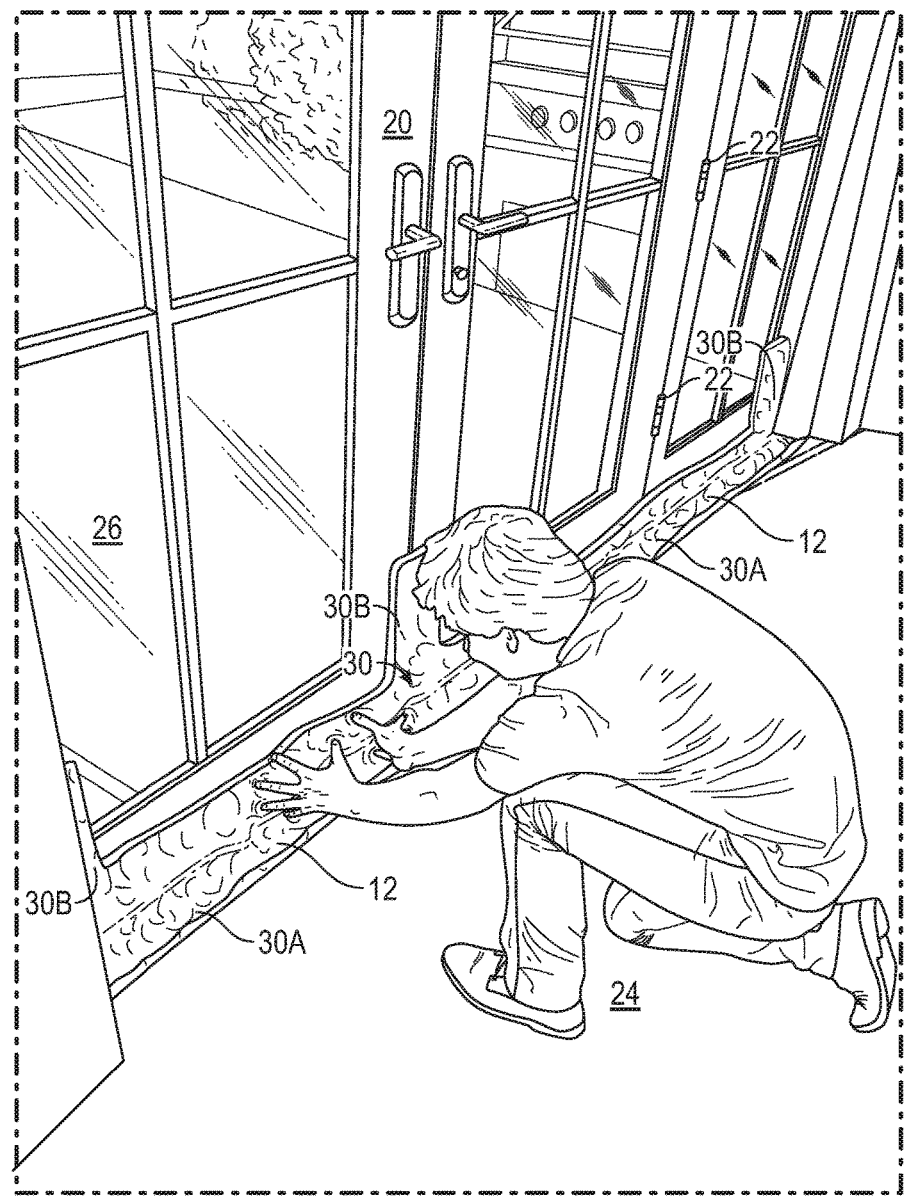
Figure 11:
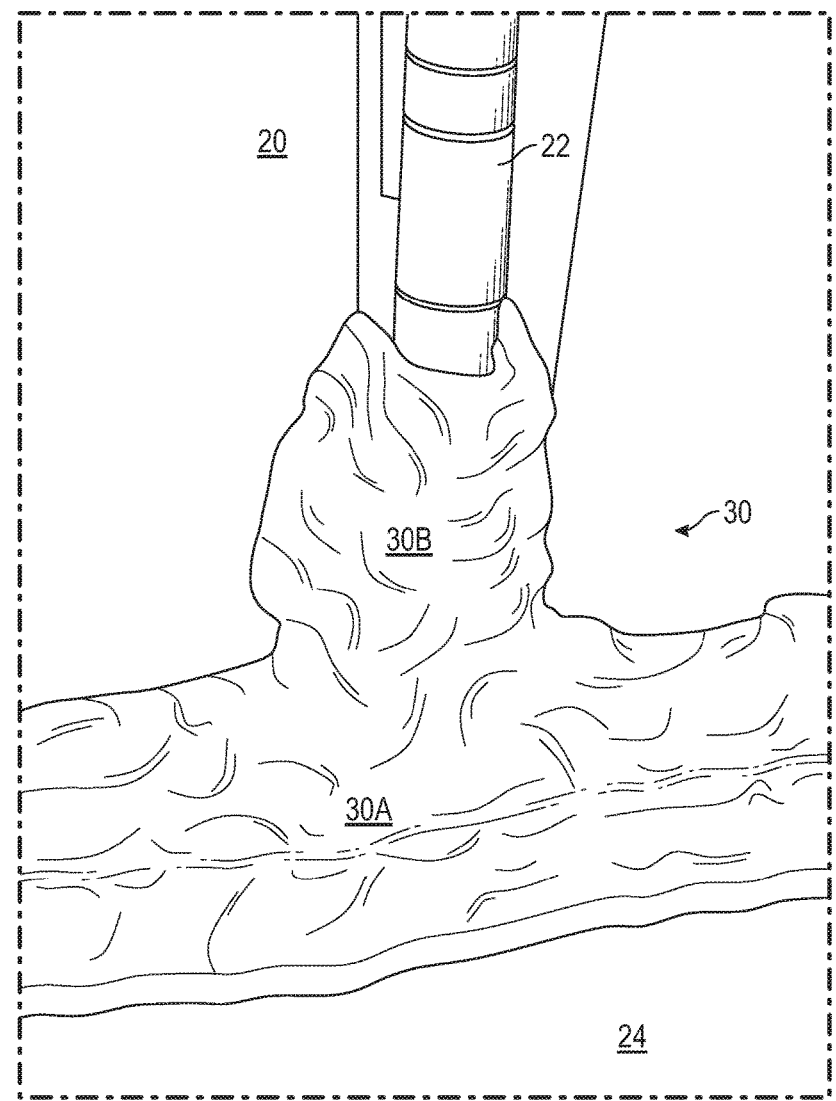

FIG. 7 depicts one illustrative embodiment of the novel seal 30 disclosed herein after the seal 30 has been installed. In this particular example, the novel seal 30 has a substantially horizontally oriented portion 30A and a plurality of substantially vertically oriented portions 30B. As shown in FIG. 7, the novel seal 30 comprises a plurality of substantially U-shaped sections in which one of the substantially vertically oriented portions 30B is effectively shared by adjacent U-shaped sections of the seal 30. To form the seal 30, in one illustrative example, a person applies force by hand to force the individual sections 12 of moldable material against one another and against the door 20 and the surrounding opening (e.g., the floor 24, the threshold (not shown) under the door 20, the door jamb and the lowermost hinges 22) so as to thereby form the substantially contiguous, substantially water-tight seal 30 comprised of the moldable material between the door 20 and at least a portion of the opening in which the door 20 is positioned. This may be accomplished by starting in the middle of the door 20 (as shown in FIG. 6) and working outward from the center of the door 20 toward one side of the door jamb, followed by doing the same process on the other side of the door 20. In other cases, the person may simply start from one end of the area to be sealed and proceed to form the seal 30 by progressing across the door 30, e.g., from left to right. During this process, the moldable material is forced into spaces between the door 20 and its opening, e.g., into spaces between the door 20 and the interior floor 24, the spaces between the door 20 and the door jamb, and the spaces between the bottom of the door and the door threshold (not shown).

FIGS. 8-11 are enlarged views of portions of the novel seal 30 disclosed herein after the seal 30 has been installed. FIG. 10 is a cross-sectional view taken where indicated in FIG. 9. In the example shown in FIG. 8, one of the vertically oriented portions 30B of the seal 30 seals a portion of the gap 21 between the doors 20. In the example shown in FIG. 9, another one of the vertically oriented portions 30B of the seal 30 effectuates a seal between a portion of the door 20 and a vertical portion (but not all) of the door jamb 25. As shown in FIG. 10, when viewed in a cross-section taken where indicated in FIG. 9, the seal 30 has a substantially L-shaped configuration (that is reversed due to the cross-sectional view) with a substantially vertically oriented leg 31A that engages the interior surface of the door 20 and a substantially horizontally oriented leg 31B that engages the interior floor 24. Due to the nature of human installation and hand molding, there will normally be an irregular curved transition 31C between the substantially vertically oriented leg 31A and the substantially horizontally oriented leg 31B. In one particularly illustrative embodiment, the material with the L-shaped configuration shown in FIG. 10 may be made using a single block 12 of moldable material. Also note that portions of the seal 30, i.e., portions of the moldable material 12 are positioned under the door 20 and above the simplistically depicted door threshold 47. In the example shown in FIG. 11, yet another vertically oriented portion 30B of the seal 30 effectuates the seal between the door 20 and a lowermost hinge 22. In FIGS. 8-11, the substantially horizontally oriented portion 30A of the seal 30 effectuates the seal between the door 20 and the interior floor 24.

Figure 12:
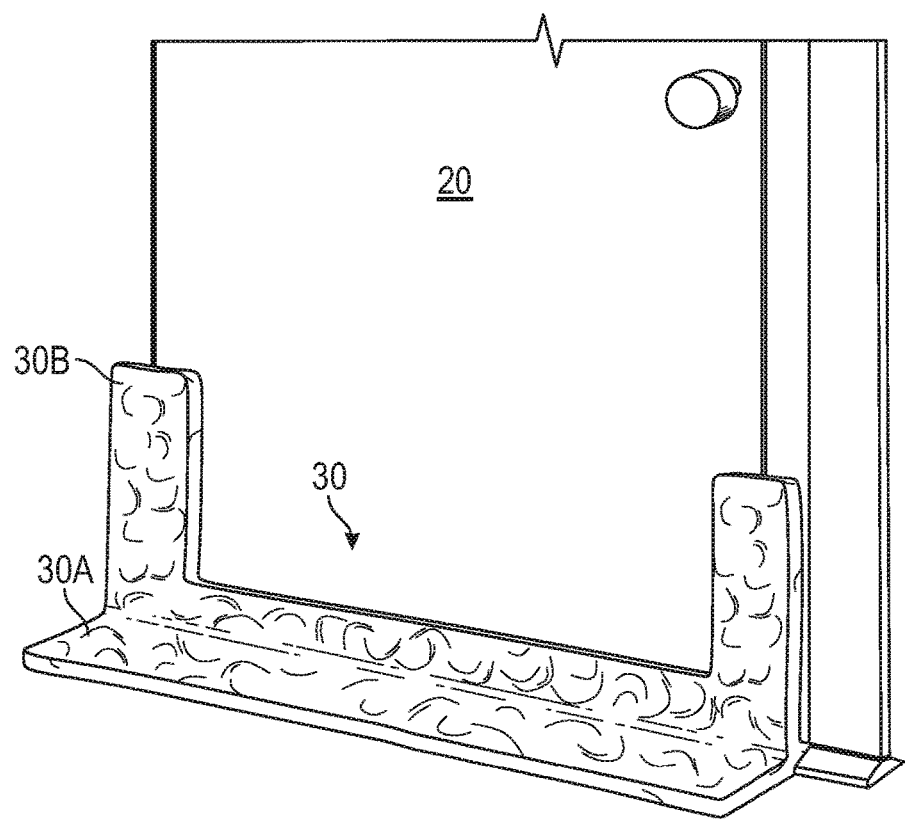

With reference to FIG. 8, the vertical height 23 of the substantially vertically oriented portion(s) 30B of the seal 30 may extend for any desired distance and it may vary depending upon the particular application, e.g., about 10-12 inches (depending upon the initial size of the individual sections 12 of moldable material and/or the desired height of the seal 30 as desired by the homeowner). Moreover, in the case where the seal 30 comprises multiple substantially vertically oriented portions 30B, the height of the substantially vertically oriented portions 30B need not all be the same. In one particular example, the substantially vertically oriented portion(s) 30B may have a height that corresponds approximately to the length 12L of one of the individual sections 12 of moldable material. In other applications, the vertical height 23 may approximately correspond to two or more individual sections 12 of moldable material. However, as will be appreciated by those skilled in the art, in some applications, the novel seal 30 disclosed herein may not include any of the substantially vertically oriented portions 30B. FIG. 12 is a perspective view showing the installation of the seal 30 on a single door 20. As depicted, portions of the moldable material are forced under the bottom of the door 20 and above the door threshold 47 so as to effectuate this portion of the seal 30.

Figure 13:
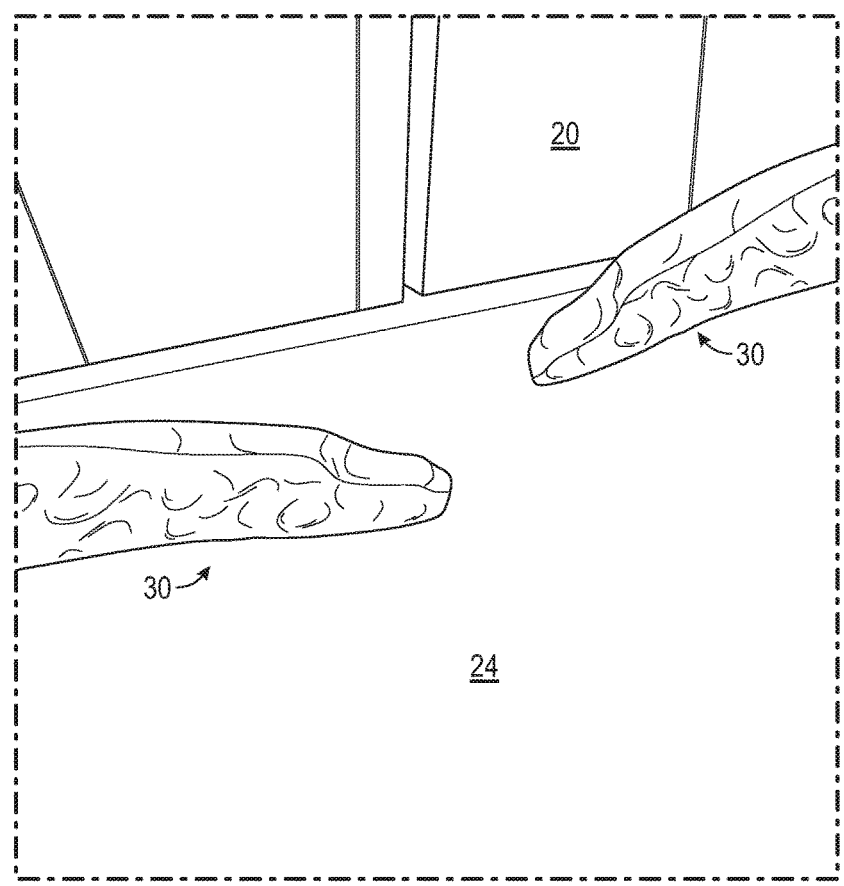

As noted above, the seal disclosed herein is temporary in nature. Once the danger of water entering the building or residence has passed, the novel seal 30 disclosed herein may be readily removed by simply pulling the seal 30 apart by hand, as shown in FIG. 13. Importantly, the moldable material used for the seal 30 described herein is not anticipated to cause any appreciable damage to the surfaces it contacts, such as an interior stained surface of a door or wooden floors within a residence. After the seal 30 is removed, any residual portions of the moldable material may be removed using a damp cloth. In one particular application where the inventor installed such a seal 30 on the interior surface of a stained wooden door, there was no appreciable damage to the stained wooded door when the moldable material was removed after a test was performed to verify the integrity of the seal.

Figure 14:
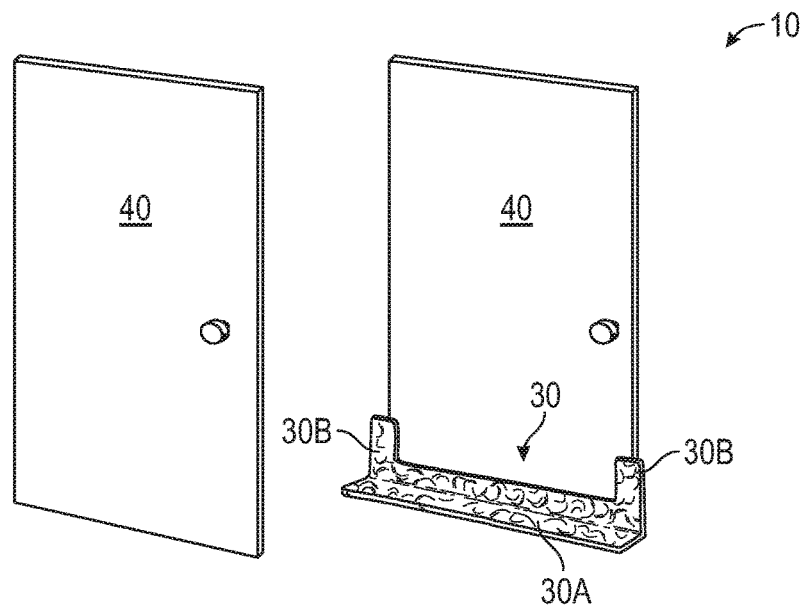
Figure 15:
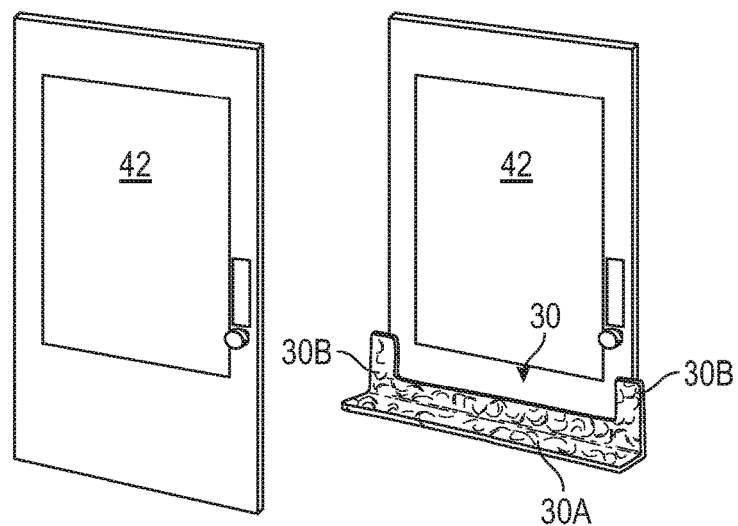
Figure 16:
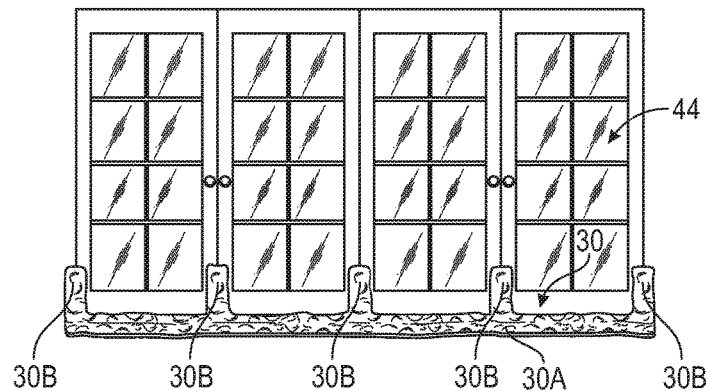
Figure 17:
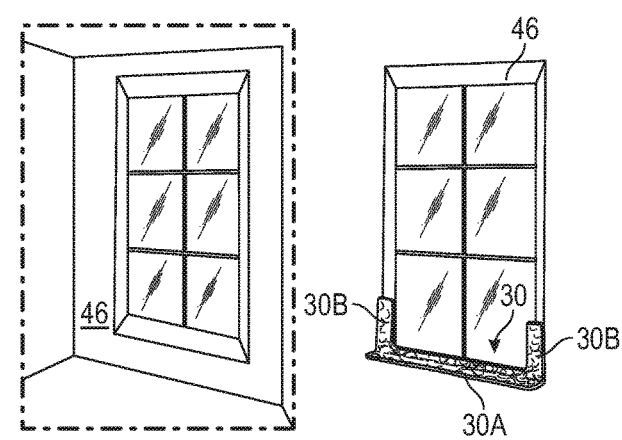
Figure 18:
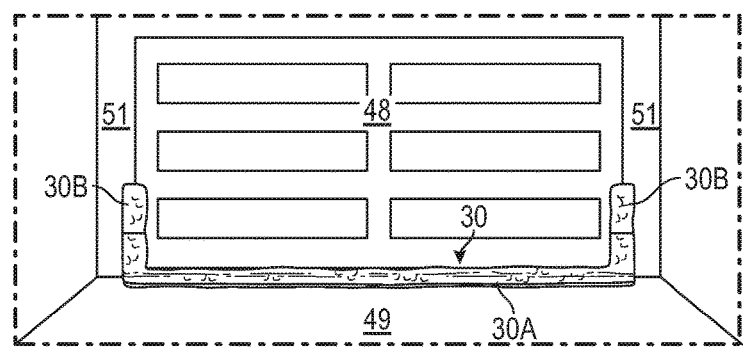

As noted above, the novel seal 30 disclosed herein may be used to form a temporary seal on a variety of different structures. For example, FIG. 14 depicts an example wherein the illustrative U-shaped seal 30 disclosed herein was formed around a traditional single (hollow or solid) wooden or metal door 40. FIG. 15 depicts an example wherein the illustrative U-shaped seal 30 disclosed herein was formed around a typical commercial storefront door 42 with a glass panel. FIG. 16 depicts an example wherein the illustrative U-shaped seal 30 disclosed herein was formed on the interior surfaces of a set of French doors 44. FIG. 17 depicts an example wherein the illustrative U-shaped seal 30 disclosed herein was formed around a typical window 46, wherein the seal 30 engages interior surface portions of the window jamb and the window sill. FIG. 18 depicts an example wherein the illustrative U-shaped seal 30 disclosed herein was formed around a typical garage door 48, wherein the seal 30 engages portions of the interior surface of the garage door 48, the sidewalls 51 of the garage door opening and the interior garage floor 49. As noted above, if desired, the seal 30 could also be formed on the exterior surface of the garage door 48 wherein it would also engage the driveway.

Figure 19:
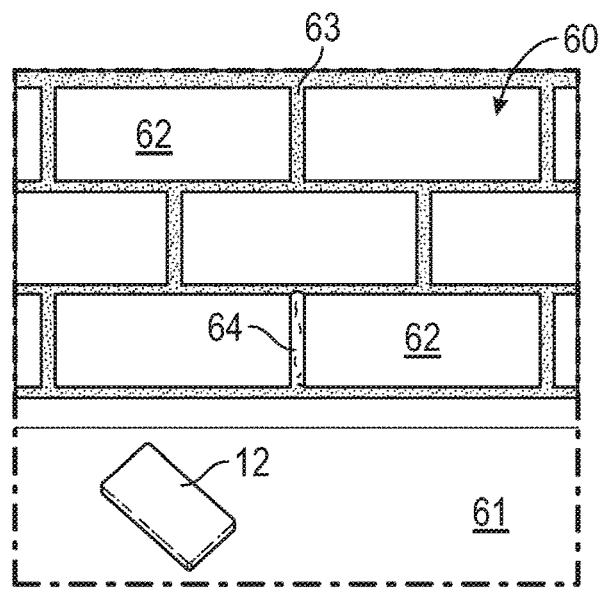
Figure 20:
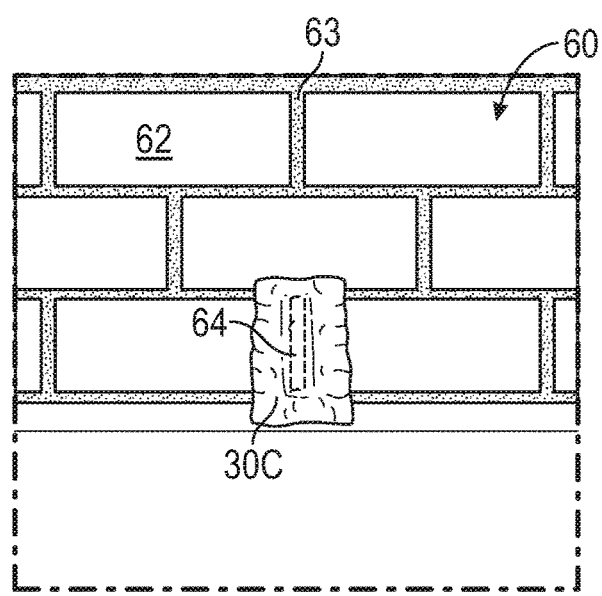

The methods and materials disclosed herein may also be employed to temporarily plug other potential paths or holes for water ingress into a building during flooding conditions. As used herein, the term "building" shall be understood to include any type of structure, such as a commercial building or a residential structure (e.g., single family home, a townhouse, etc.). FIGS. 19-20 illustrate the exterior 60 of a building that is formed on a foundation 61. In this example, the building has a brick exterior comprised of a plurality of bricks 62 with mortar 63 between the bricks 62. As is common practice, such a building may have a plurality of weep holes 64 in the brick wall at a plurality of locations around the perimeter of the building so as to prevent moisture build-up behind the brick wall. Unfortunately, during flooding conditions, such weep holes 64 provide a path for flood water to enter into the building.

However, as shown in FIGS. 19 and 20, using the methods disclosed herein, portions of the sections 12 of moldable material may be used to form a temporary plug 30C in all of the weep holes 64, thereby providing an additional barrier to flood waters entering the building. FIG. 19 depicts the building just prior to plugging the illustrative weep hole, while FIG. 20 depicts the building after a portion of the section 12 of moldable material was forced into the weep hole 64 and between the adjacent bricks 62 on opposite sides of the weep hole 64. As depicted in FIG. 20, portions of the plug 30C engage the exterior surface of the building, i.e., the exterior surfaces of the bricks 62, mortar 63 and foundation 61 so as to effectuate the sealing of the weep holes 64. Of course, the weep hole 64 depicted in FIGS. 19 and 20 is just one example of a potential path for water ingress that may be temporarily sealed using the method disclosed herein. For example, other possible areas that may be temporarily plugged using the methods disclosed herein, include, but are not limited to, plumbing or electrical penetrations of the building that are located at or near ground level, etc. After having benefit of the present disclosure, people of ordinary skill in the art may recognize many other potential applications for the methods and devices disclosed herein.

Thus, the presently disclosed inventions should not be considered to be limited to the illustrative examples depicted herein.

The instructions included with the kit 10 may include all or portions of the text above (or equivalent text) describing how to position the sections 12 of moldable material adjacent a structure to be sealed and how to deform the moldable material so as to form the temporary seal 30 and/or plug 30C. The instructions may also include one or more of the drawings in this application, such as FIGS. 5-7 and 19-20, or drawings that depict similar activities as it relates to the formation of the temporary seal 30 and/or plug 30C. In some cases, the kit 10 may contain both text and drawings to instruct an individual as to how to form the temporary seal 30 and/or plug 30C disclosed herein.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

What is claimed:

1. A method, comprising:
   positioning a plurality of individual sections of a moldable material adjacent one another and adjacent a first structure to be sealed, the first structure being operatively coupled to a second structure comprising an opening wherein the first structure to be sealed is adapted to be moved from an open position to a closed position, and vice versa, relative to the opening in the second structure and wherein the moldable material comprises one of a modeling compound, plastilina or plastilina clay;
   moving the first structure to be sealed to the closed position relative to the opening in the second structure;
   with the first structure to be sealed in the closed position relative to the opening in the second structure, forcing the individual sections of moldable material against one another and at least the first structure so as to deform the plurality of individual sections and thereby form a substantially contiguous temporary seal comprised of the moldable material between the first structure and at least a portion of the opening in the second structure;
   removing the substantially contiguous temporary seal; and
   after removing the substantially contiguous temporary seal, and while the first structure remains operatively coupled to the second structure, moving the first structure from the closed position relative to the opening to the open position relative to the opening.

2. The method of claim 1, wherein the first structure comprises a door and the second structure comprises a door jamb positioned above a floor, wherein the opening is at least partially defined by the door jamb and the floor, and wherein the individual sections of moldable material are forced against at least the door, the floor and the door jamb.

3. The method of claim 2, wherein the door is operatively coupled to the door jamb by at least one hinge, and wherein at least one of the individual sections of moldable material is forced against at least the door and the at least one hinge.

4. The method of claim 1, wherein the first structure comprises a window and the second structure comprises a window sill, wherein the opening is at least partially defined by the window sill, and wherein the individual sections of moldable material are forced against at least the window and the window sill.

5. The method of claim 1, wherein the first structure comprises a garage door and the second structure comprises a garage with sidewalls and a floor, the sidewalls being positioned above the floor, wherein the opening is at least partially defined by the sidewalls of the garage and the floor, and wherein the individual sections of moldable material are forced against at least the garage door, the sidewalls of the garage and the floor.

6. The method of claim 1, wherein positioning the plurality of individual sections of moldable material adjacent one another and adjacent the first structure comprises positioning the plurality of individual sections of moldable material adjacent at least one of an interior surface or an exterior surface of the structure.

7. The method of claim 1, wherein forcing the individual sections of moldable material against one another and at least the first structure comprises manually applying force to the individual sections of moldable material.

8. The method of claim 1, wherein forcing the individual sections of moldable material against one another and at least the first structure comprises forcing at least some of the moldable material between at least a portion of the first structure and at least a portion of the opening.

9. The method of claim 1, wherein the substantially contiguous seal comprises a substantially horizontally oriented portion and at least one substantially vertically oriented portion.

10. The method of claim 1, wherein at least a portion of the substantially contiguous seal has a substantially U-shaped configuration that comprises a horizontally oriented portion and at least two substantially vertically oriented portions.

11. The method of claim 1, wherein the second structure is part of a building, wherein the building comprises a plurality of holes of potential water ingress into the building, wherein the method further comprises forcing at least a portion of at least one of another section of moldable material into the hole so as to deform the at least one of another section of moldable material and thereby form a temporary plug seal comprised of the moldable material in each of the plurality of holes, wherein the temporary plug engages an outer surface of the building.

12. The method of claim 11, wherein the plurality of holes are weep holes in a brick wall.

13. A method, comprising:
positioning a plurality of individual sections of a moldable material adjacent one another and adjacent a first structure to be sealed, the first structure being operatively coupled to a second structure comprising an opening, wherein the first structure to be sealed is adapted to be moved from an open position to a closed position, and vice versa, relative to the opening in the second structure and wherein the moldable material comprises one of a modeling compound, plastilina or plastilina clay;
moving the first structure to be sealed to the closed position relative to the opening in the second structure;
with the first structure to be sealed in the closed position relative to the opening in the second structure, manually forcing the individual sections of moldable material against one another and at least the first structure so as to force at least some of the moldable material between at least a portion of the first structure and at least a portion of the opening in the second structure so as to thereby form a substantially contiguous temporary seal comprised of the moldable material between the first structure and at least a portion of the opening in the second structure, wherein the contiguous temporary seal has a substantially horizontally oriented portion and at least one substantially vertically oriented portion;
removing the substantially contiguous temporary seal; and
after removing the substantially contiguous temporary seal, and while the first structure remains operatively coupled to the second structure, moving the first structure from the closed position relative to the opening to the open position relative to the opening.

14. The method of claim 13, wherein the first structure comprises a door and the second structure comprises a door jamb positioned above a floor, wherein the opening is at least partially defined by the door jamb and the floor, wherein the individual sections of moldable material are forced against at least the door, the floor and the doorjamb.

15. The method of claim 14, wherein the door is operatively coupled to the door jamb by at least one hinge, and wherein at least one of the individual sections of moldable material is forced against at least the door and the at least one hinge.

16. The method of claim 13, wherein the substantially contiguous seal has a substantially U-shaped configuration and wherein the U-shaped seal comprises the substantially horizontally oriented portion and at least one additional substantially vertically oriented portions.

17. The method of claim 13, wherein the second structure is part of a building, wherein the building comprises a plurality of holes of potential water ingress into the building, wherein the method further comprises forcing at least a portion of at least one of another section of moldable material into the hole so as to deform the at least one of another section of moldable material and thereby form a temporary plug seal comprised of the moldable material in each of the plurality of holes, wherein the temporary seal engages an outer surface of the building.

18. The method of claim 17, wherein the plurality of holes are weep holes in a brick wall.

* * * * *

UNITED STATES PATENT AND TRADEMARK OFFICE
CERTIFICATE OF CORRECTION

PATENT NO. : 10,294,715 B1
APPLICATION NO. : 15/860179
DATED : May 21, 2019
INVENTOR(S) : Diana L. Hertel Page 1 of 1

It is certified that error appears in the above-identified patent and that said Letters Patent is hereby corrected as shown below:

In the Claims

Column 10, Line 35 (Claim 14, Line 6), change "doorjamb" to -- door jamb --.

Column 10, Line 45 (Claim 16, Line 5), change "portions" to -- portion --.

Signed and Sealed this
Twenty-fifth Day of June, 2019

Andrei Iancu
*Director of the United States Patent and Trademark Office*